Patented Mar. 30, 1954

2,673,846

UNITED STATES PATENT OFFICE 2,673,846

ANTIDIAZOTATES OF AROMATIC AMINES CONTAINING BASIC SUBSTITUENTS IN THE NUCLEUS AND PROCESS OF PREPARING THE SAME

Wilhelm Seidenfaden and Konrad Löhe, Offenbach am Main, Germany, assignor to Farbwerke Hoechst Aktiengesellschaft vormals Meister Lucius und Brüning, Frankfurt, Germany, a company of Germany No Drawing. Application November 21, 1951, Serial No. 257,644

Claims priority, application Germany November 25, 1950

10 Claims. (Cl. 260—141)

The present invention relates to antidiazotates of aromatic amines containing basic substituents in the nucleus and to a process of preparing the same; more particularly it relates to compounds corresponding to the following general formula:

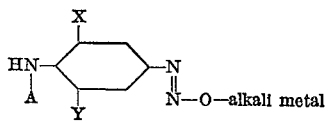

or

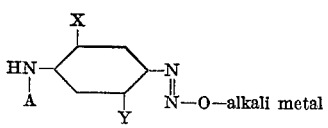

wherein X and Y represent alkyl, alkoxy groups or halogen atoms and A represents hydrogen or an alkyl group.

Antidiazotates containing basic substituents in the aromatic nucleus have, hitherto, not been described in literature. This is due to the fact that the known sensitiveness to alkalies of the diazonium compounds of aromatic amines containing basic substituents in the nucleus (Berichte der Deutschen Chemischen Gesellschaft, volume 35, page 895, German Patents 77,169 and 154,336), prevents the formation of the primary product—the syndiazotate—which can only be obtained in an alkaline medium, since, in the presence of an alkali, the decomposition of the diazonium compound proceeds much quicker than the formation of the syndiazotate. The decomposition which takes place with frothing, evolution of nitrogen and formation of resin reaches such an extent that only traces of syndiazotate can be detected.

Diazonium compounds containing basic substituents are rather widely used in the ice color industry such as, for instance, unilaterally diazotized derivatives of p-phenylene-diamine. Their application, however, is limited to those branches in which they can be used in the form of their diazonium compounds. It was not possible to use the compounds in the most important field where antidiazotates are required, i. e. the printing with Rapid Fast dyestuffs, since the abovementioned sensitiveness to alkalies of diazonium compounds substituted in such a manner does not allow the preparation of the corresponding antidiazotates. This was ascertained by our own experiments.

Now, we have found that antidiazotates of the following general formula

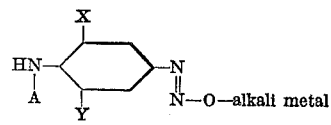

or

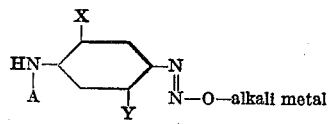

in which X and Y represent alkyl, alkoxy groups or halogen atoms and A represents hydrogen or an alkyl group, can be made from amines in which at least one hydrogen atom of the non-diazotized or non-diazotizable amino-group is acylated and which correspond to the general formula

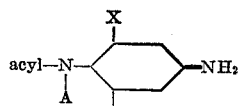

or

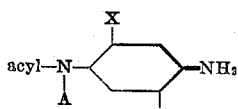

in which X, Y and A have the meaning given above.

The diazonium compounds of these bases are sufficiently stable to caustic alkalies to allow the preparation of syndiazotates. During the subsequent transposition of the resultant syndiazo-compounds by means of heat and concentrated alkali, the acyl radical is split off. By the present invention, therefore, an antidiazotate of an aromatic amine containing basic substituents in the nucleus may be prepared, for instance, according to the following scheme:

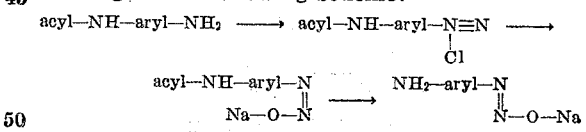

Acyl means the radical of an aliphatic and aromatic carboxylic and sulfonic acid, R—CO— and R—SO$_2$. The following acids may, for instance, be mentioned: acetic acid and its homologues, benzoic acid and its substitution products, sulfo benzoic acid, ethane sulfonic acid, benzene sulfonic acid.

As starting materials for the present process the following compounds are given as examples: 1-acetylamino-4-amino-2.6-dibromobenzene; 1-benzene-sulfonylamino-4-amino-2.6-dichlorobenzene; 1-butyrylamino-4-amino-2-chloro-5-methoxy-benzene; 1-(3'-sulfo-1'-benzoyl-amino)-4-amino-2-chloro-6-methylbenzene, 1-benzoylamino-4-amino-2,5-dichlorobenzene.

It could not be foreseen that this reaction would take the course indicated above in a quantitative manner. It was rather to be expected that the acyl radical would be split off, wholly or partly, during the diazotization or the preparation of the syndiazotate, which would inevitably lead to the formation of decomposition products, or that during the transposition of the syndiazotate into the antidiazotate the acyl radical would not be saponified quantitatively, which could affect the clearness of the shade in the manufacture of dyestuffs. By this invention it is possible to prepare a series of antidiazotates which were not accessible up to now and, thereby, to enlarge the range of Rapid Fast dyestuffs.

The following examples serve to illustrate the invention, but they are not intended to limit it thereto, the parts being by weight unless otherwise stated; the parts by weight and the parts by volume are related to each other as are kilograms to liters:

*Example 1*

A diazonium chloride solution prepared in the usual manner from 165 parts of 1-acetylamino-4-amino-2.6-dichloro-benzene is poured into a solution of 600 parts of caustic potash in 900 parts by volume of water, while well stirring, care being taken by external cooling that the temperature of the solution does not exceed +5° C. 2400 parts by volume of a clear brownish solution are obtained which contains the potassium 1-acetylamino-2.6-dichlorobenzene-4-syndiazotate. For the transposition into the antidiazotate, the syndiazo-solution is poured into a hot solution of 1200 parts of caustic potash in 300 parts by volume of water, while well stirring and maintaining the temperature at 130° C.–140° C. Under the reaction conditions indicated above, the transposition of the syndiazotate into the antidiazotate takes place and, at the same time, the acetyl group is split off. Already during the reaction, the antidiazotate separates for the major part in the form of fine crystals. When the introduction of the syndiazo-solution is finished, the temperature is kept at about 130° C. for a further 5 minutes. The whole is then allowed to cool to about 80° C., the pasty mass is diluted with 1200 parts by volume of water, filtered with suction and the adhering liquid is removed to a large extent by pressing.

380 parts of a brownish press cake are obtained which dissolves in water to an almost clear solution and which contains 38.9 per cent. of potassium 1-amino-2.6-dichloro-benzene-4-antidiazotate of the following formula

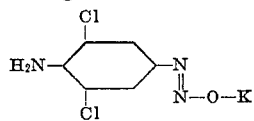

besides caustic potash and inorganic salts formed during the reaction process. In its present form the product may be further treated without purification, for instance, it may be used for the manufacturing of Rapid Fast dyestuffs.

By using instead of 1-acetylamino-4-amino-2.6-dichlorobenzene an equivalent amount of 1-(4'-chlorobenzoylamino)-4-amino-2.6-dichlorobenzene or 1-(butanesulfonylamino)-4-amino-2.6-dichlorobenzene and proceeding as indicated in this example, the same antidiazotate is obtained.

*Example 2*

A diazonium solution prepared in the usual manner from 219 parts of 1-acetylamino-4-amino-2.6-dibromobenzene is introduced at about 0° C., while well stirring, into an excess of a caustic potash solution of 40 per cent. strength.

The solution of the potassium 1-acetylamino-2.6-dibromobenzene-4-syndiazotate so obtained is caused to run at 135° C.–145° C. into a caustic potash melt, whereby the compound is transposed and saponified and the potassium 1-amino-2.6-dibromobenzene-4-antidiazotate is obtained.

*Example 3*

A diazo-solution prepared in the usual manner from 1-propionylamino-4-amino-2.5-dichlorobenzene is transformed in the cold by means of an alkali into the syndiazotate; at a temperature between 130° C. and 150° C., this compound is saponified and transposed in a caustic alkali melt to form the sodium 1-amino-2.5-dichlorobenzene-4-antidiazotate.

By using instead of the propionyl compound the corresponding benzenesulfonyl or p-toluenesulfonyl compound and proceeding as indicated above, the same antidiazotate is obtained.

*Example 4*

The syndiazotate of diazotized 1-acetylamino-4-amino-2.5-dibromobenzene is prepared in the usual manner at about 0° C. When this syndiazotate is treated in a caustic alkali melt at about 140° C., the acetyl group is split off and, at the same time, transposition takes place with formation of the sodium 1-amino-2.5-dibromobenzene-4-antidiazotate.

In the manner described in the foregoing examples, for instance, the following bases can be converted into the antidiazotates:

1-butyrylamino-4-amino-2-chloro-5-methoxy-benzene, 1-acetaylamino-4-amino-3-chloro-6-methoxy-benzene, 1-(3'-sulfo-1'-benzoylamino)-4-amino-2-chloro-6-methylbenzene, 1-acetylamino-4-amino-2-chloro-6-methylbenzene.

We claim:

1. A process of preparing antidiazotates of aromatic amines containing basic substituents in the nucleus which comprises diazotizing amines corresponding to the following general formula

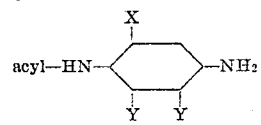

wherein X stands for a member of the group consisting of chlorine and bromine, one Y is hydrogen and the other Y is a member of the group consisting of chlorine and bromine, transforming the diazonium compounds into their syndiazotates by means of a cold caustic alkali solution, saponifying and transposing these compounds into the antidiazotates by heating them with a concentrated caustic alkali solution.

2. A process of preparing antidiazotates of aromatic amines containing basic substituents in the nucleus which comprises diazotizing amines corresponding to the following general formula

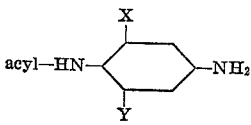

wherein X and Y stand for members of the group consisting of chlorine and bromine, transforming the diazonium compounds into their syndiazotates by means of a cold caustic alkali solution, saponifying and transposing these compounds into the antidiazotates by heating them with a concentrated caustic alkali solution at temperatures between about 130° C. and about 150° C.

3. A process of preparing antidiazotates of aromatic amines containing basic substituents in the nucleus which comprises diazotizing amines corresponding to the following general formula

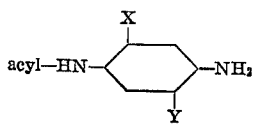

wherein X and Y stand for members of the group consisting of chlorine and bromine, transforming the diazonium compounds into their syndiazotates by means of a cold caustic alkali solution, saponifying and transposing these compounds into the antidiazotates by heating them with a concentrated caustic alkali solution at temperatures between about 130° C. and about 150° C.

4. The antidiazotates corresponding to the following general formula

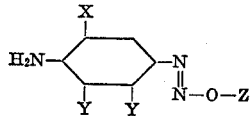

wherein X stands for a member of the group consisting of chlorine and bromine, one Y is hydrogen and the other Y is a member of the group consisting of chlorine and bromine, and Z stands for an alkali metal.

5. The antidiazotates corresponding to the following general formula

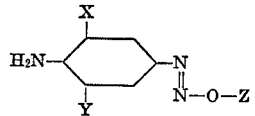

wherein X and Y stand for members of the group consisting of chlorine and bromine, and Z stands for an alkali metal.

6. The antidiazotate coresponding to the following formula

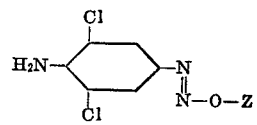

wherein Z stands for an alkali metal.

7. The antidiazotate corresponding to the following formula

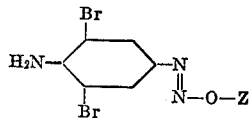

wherein Z stands for an alkali metal.

8. The antidiazotates corresponding to the following general formula

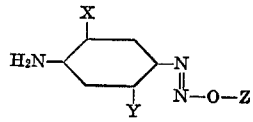

wherein X and Y stand for members of the group consisting of chlorine and bromine, and Z stands for an alkali metal.

9. The antidiazotate corresponding to the following formula

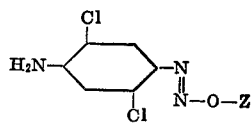

wherein Z stands for an alkali metal.

10. The antidiazotate corresponding to the following formula

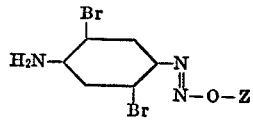

wherein Z stands for an alkali metal.

WILHELM SEIDENFADEN.
KONRAD LÖHE.

References Cited in the file of this patent

UNITED STATES PATENTS

| Number | Name | Date |
| --- | --- | --- |
| 531,973 | Schraube et al. | Jan. 1, 1895 |
| 531,975 | Schraube et al. | Jan. 1, 1895 |
| 2,032,110 | Bonhote | Feb. 25, 1936 |
| 2,067,132 | Schnitzpahn et al. | Jan. 5, 1937 |
| 2,119,891 | Seidenfaden et al. | June 7, 1938 |

FOREIGN PATENTS

| Number | Country | Date |
| --- | --- | --- |
| 434,158 | Great Britain | Aug. 27, 1935 |